G. BERARDI.
APPLIANCE FOR PREVENTING FRAUD IN CONNECTION WITH ELECTRICITY METERS.
APPLICATION FILED AUG. 21, 1909.
999,196.
Patented Aug. 1, 1911.
3 SHEETS—SHEET 1.
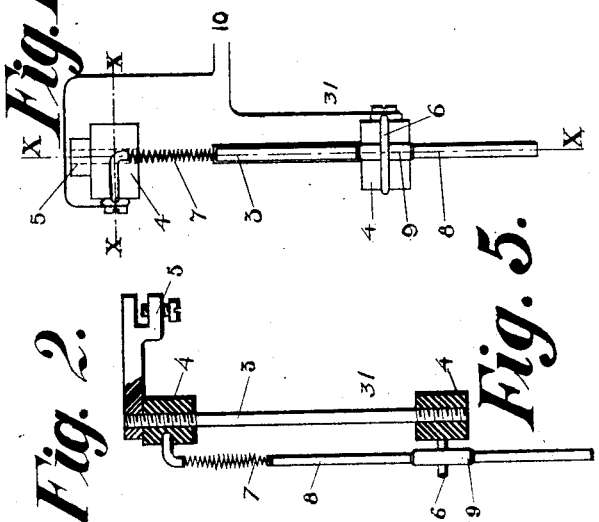
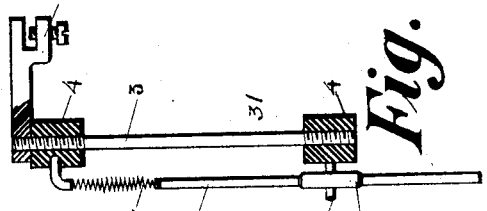
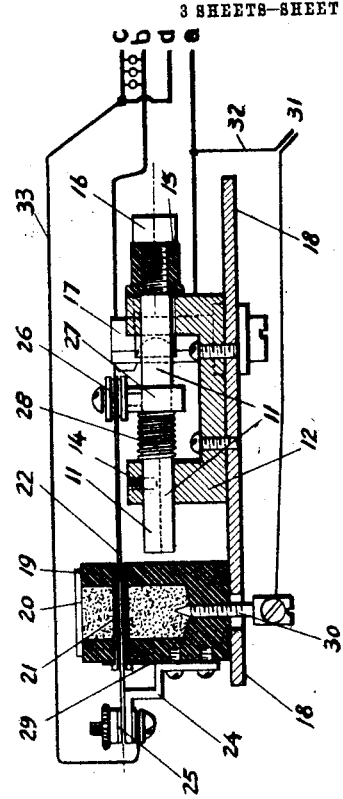
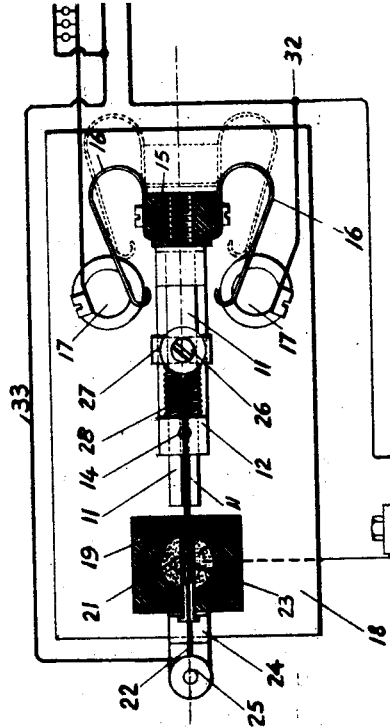
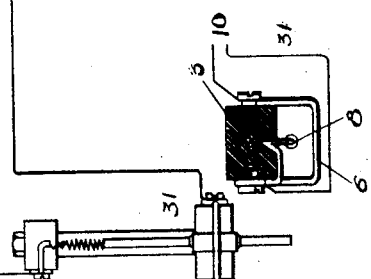
Witnesses
C. Schallenger
R. Goodstein
Inventor
Giacomo Berardi
by B. Singer
his Atty G. BERARDI.
APPLIANCE FOR PREVENTING FRAUD IN CONNECTION WITH ELECTRICITY METERS.
APPLICATION FILED AUG. 21, 1909.
999,196.  Patented Aug. 1, 1911.
3 SHEETS—SHEET 2.
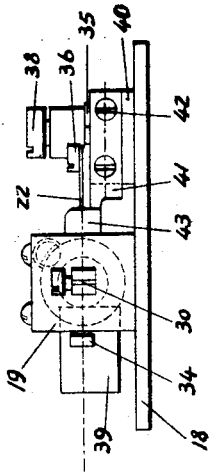
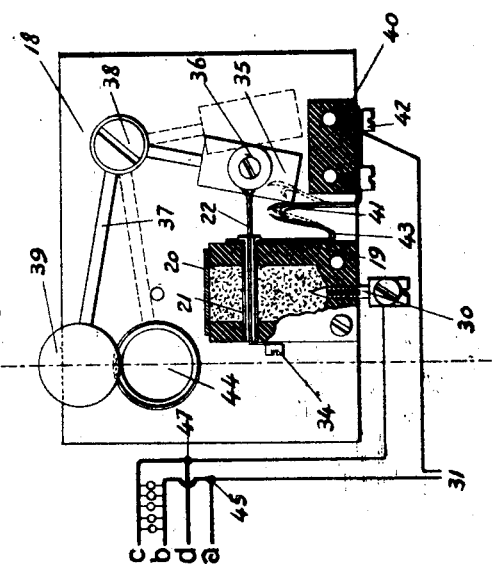
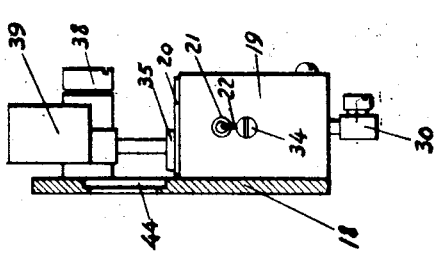
Witnesses
C. Schallinger
R. Nordstein
Inventor
Giacomo Berardi
by B. Singer
his Atty

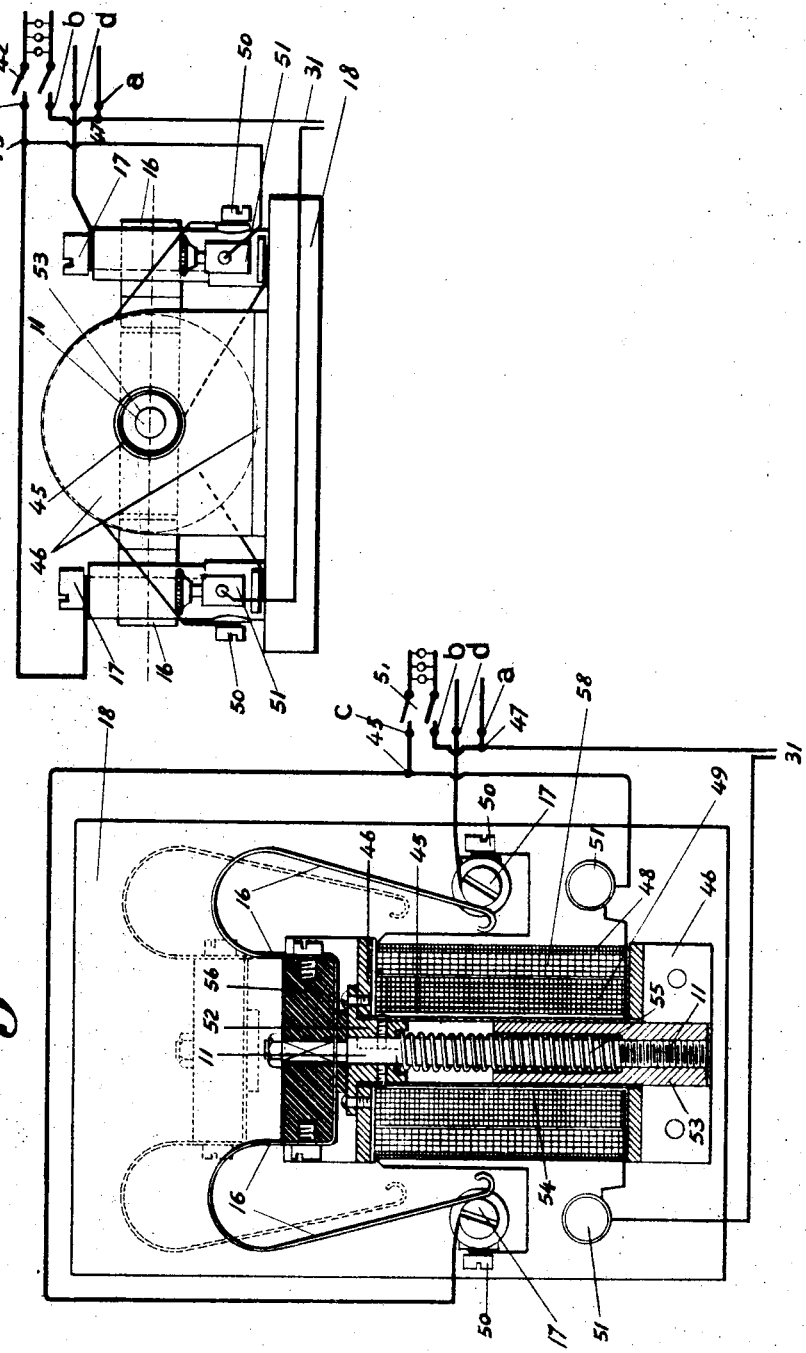

UNITED STATES PATENT OFFICE.

GIACOMO BERARDI, OF GENOA, ITALY.

APPLIANCE FOR PREVENTING FRAUD IN CONNECTION WITH ELECTRICITY-METERS.

999,196.  Specification of Letters Patent.  Patented Aug. 1, 1911.

Application filed August 21, 1909. Serial No. 513,969.

*To all whom it may concern:*

Be it known that I, GIACOMO BERARDI, electrician, a subject of the King of Italy, residing at Genoa, Italy, have invented a new and useful Appliance for Preventing Fraud in Connection with Electricity-Meters, of which the following is a specification.

The invention relates to an appliance for use in connection with electricity meters to prevent fraud and a consumer from obtaining a supply of electric energy by unauthorized means.

Frauds and the theft of electric energy can be effected in connection with any electricity meter on the market, by bringing a magnetic flux near the meter thus causing its recording mechanism to slow down or even stop, the current continuing however to be consumed without being registered.

The object of the present invention is to prevent this serious drawback, and it consists in means whereby if a magnet is brought near the meter with a fraudulent intention, the completion of a shunt circuit is effected by the closing of a system of contacts. This shunt circuit in its electrothermic or electro-dynamic effects is applied to open a working circuit or to actuate an indicator device, thereby stopping the current to the consumer or indicating the frauds of energy at the meter.

The invention will now be described with reference to the accompanying drawings, in which—

Figures 1, 2 and 3 are a front elevation, side sectional elevation and sectional plan view on line X—X respectively, of a contact device which is extremely sensitive to any outside magnetic influence, such device forming the essential and first part of the invention. Fig. 4 is a plan view of a switch adapted to be actuated when the contact device shown in Figs. 1 to 3 is closed, the contact being shown in connection with said switch. Fig. 5, is a sectional view of said switch, the contact device being omitted. Figs. 6, 7 and 8 are respectively a side elevation partly in section, a front elevation partly in section and a bottom plan view, of a fraud indicating device, and Figs. 9 and 10 are a sectional front elevation and a reverse plan view of a modified switch, similar to the device shown in Figs. 4 and 5.

In Figs. 1, 2 and 3, a contact making device 31 is shown, wherein 3 is a fixed vertical brass rod fastened to two blocks of insulating material 4, 4. To the upper block is fastened a support 5 with a binding screw to attach the apparatus to the meter. Upon the lower insulated block 4, is arranged a U-shaped metallic clip 6. A wire 8 preferably made of soft iron and showing an enlargement at 9 is suspended from a spiral spring 7 so as to allow any convenient movement of the wire 8. The conductors are indicated diagrammatically at 10. The contact closing device 31, as described, is inserted into the consumer's circuit in the meter casing, so that under normal conditions the soft iron wire 8 is resting against the lower insulating block 4. When a magnet or any other magnetical retarding device is brought into the neighborhood of the meter the wire 8 will swing against the clip 6 and the metallic circuit through spiral 7, wire 8, clip 6 and conductors 10 will be closed. It is advisable to dispose more than one of these contact devices in the meter casing, for the purpose of securing a quick and safe action of the device for every direction in which the retarding influence may approach the meter. This system of contacts is inserted in the shunt circuit in such a way that one of its poles is connected by a binding screw to the spiral 7 and its other pole through the binding screw with the metallic clip 6.

The second part of the invention according to one modification is represented in Figs. 4 and 5 and forms an automatic switch, which is actuated by the effect produced by the device shown in Figs. 1, 2 and 3 and forming the first part of the invention.

In Figs. 5 to 10 the contact making device 31 is not illustrated in the same way as in Figs. 1 to 4. It is only indicated by the wires leading thereto and by the reference numeral 31. The attachment of this device to the current breaking or fraud indicating device is readily comprehensible for every expert in the art.

In the Figs. 4 and 5, 11 is a cylindrical metal rod supported and guided in a frame 12 of insulating material. 14 is a pin which prevents the rod 11 from turning in its bearings. To the forward end of rod 11 is connected an insulating piece 15, with which are connected the bent pieces 16, formed by strips of copper or other good conducting material. These copper strips are in contact with the binding posts 17, 17 which are mounted upon the plate 18 and insulated therefrom. Upon the plate 18 is also arranged a porcelain container 19 having a cover 20. A small nickel tube 21 passes through the container 19 and within the tube 21 there is arranged a copper wire 22 in two parts braced together at 23. This copper wire is connected at one end with a non-magnetic metal support 24 by means of binding screw 25 and at its other end to a metal ring 26 and annular piece 27 upon the rod 11. Between the annular piece 27 and the side portion of frame 12 a spiral spring 28 is arranged of non-magnetic material. When the rod 11 is in its extreme position against the container 19, a closed circuit is completed between the metal strips 16 and the binding posts 17, the spring 28 being compressed in this position. The nickel tube 21 is in electric contact with the binding screw 25, plate 29 and support 24. At and within the lower end of the container 19 a nickel pin 30 is arranged with one pointed end at a convenient distance from the tube 21 and having at the other end a binding screw. The container 19 is filled with an electrical conductor in the form of powder of great resistance and unaffected by air and heat. A powder of the described qualities may be made by mixing powdered graphite with carbonate of calcium.

The connections are as follows: a and d are the two main line wires; b and c are the wires of the consumers' circuit. In series with the consumers' line may be the series-field coil of the meter, which is not shown. The circuit will then be the following: main line a, binding post 17, switch 16, binding post 17, consumer wire b, electrical devices, consumers' line c, main line d.

The contact making device 31 is shunted between a main line and a line of the consumers' circuit, and is adapted to displace the switch, when said device is actuated. From the main line a, a branch wire 32 leads to the contact device 31, which is indicated diagrammatically on the drawing and there may be a plurality of the devices illustrated in Figs. 1, 2 and 3. The expert in the art will readily understand, that wire 32 will be connected to the spiral 7, and set-screw 30 will be in conducting condition with the metallic clip 6.

The apparatus works as follows: When electric energy is being delivered regularly in the usual way that is to say, without any attempt to defraud, the current passes from the main a to one of the binding posts 17, through the copper strips 6, the other binding post 17, and passes to the terminal b, in order that it may be utilized; for lighting, power purposes and the like and returns through c to the main d, or vice versa. Should however the contact 31 be actuated by the influence of an outside magnetic flux, a shunt circuit will be completed through lead 32, contact 31, screw 30, the porcelain container 19, nickel tube 21, plate 29, support 24, binding screw 25 and wire 33 or vice-versa. The current causes an increase of temperature in passing through the conducting powder in the container 19. The heat energy is proportional to the square of the current and to the resistance. The current will heat the nickel tube 21 and the wire 22 at its braced part 23. The connection of the wire at the part 23 will begin to melt and is thereupon separated by means of the spring 28. The rod 11 is now pressed back to its other extreme position by spring 28 and the contact between the copper strips 16 and binding posts 17 is interrupted thereby breaking the main circuit.

By suitably selecting the respective amounts of the ingredients of the powder and by using a more or less heavy copper wire a predetermined sensitiveness can be given to the apparatus so as to avoid an opening or breaking of the main circuit accidentally for instance by seismic oscillations or in case of a magnetic flux being brought past the meter.

The apparatus shown in Figs. 6, 7 and 8 represents an electric indicator the function of which is to indicate only a fraud effected at the meter without breaking the current to the consumer. In this apparatus there is also provided a cup container with cover 20, tube 21 and binding screw 30. The container is mounted upon the plate 18. The wire 22 is made of lead or other easily fusible metal, passes through the tube 21, is connected at one end to the rear wall of the container 19 by means of binding screw 34 and at the other end to the block 35 of insulating material by means of screw 36. The block 35 is fastened to the end of the vertical arm of the bell crank lever 37 the latter oscillating around fulcrum 38, the parts being made of non-magnetic material. A disk 39 is arranged on the end of the horizontal arm of the lever 37. A block 40 of fibrous material is fastened upon the plate 18. The plate spring 41 is fastened to the block 40 by means of two screws, of which the one 42 represents the binding screw. The length of wire 22 is such that the block 35 presses against the spring 41, which latter is in contact with another spring 43 of V-shape, and attached to the tube 21. The disk 39 is located above an opening 44 arranged in the plate 18 and protected by glass. The connections of the apparatus are as follows: On the inside circuit is arranged the shunt circuit 45—47. One terminal 45 is connected to one part of the contact 31, the other part of 31 being connected with binding screw 42. The other terminal 47 is connected to the binding screw 30. The indicator works as follows; If with the intention of fraudulently obtaining current, a magnetic flux is brought close to the meter, the magnetic field thereof will be changed. Under these conditions the contact 31 will be closed thus completing the shunt circuit through the terminal 45 contact 31, screw 42, springs 41, 43, tube 21, the powder resistance, binding screw 30 and terminal 47 or vice versa. The current in passing through the conducting powder, causes an increase of temperature, heats the tube 21, and melts the wire 22 one end of which is drawn back by the spring 41 and the weight of the disk 39, the latter affecting the lever 37, which by its disk 39 through breakage of wire 22, covers the opening 44, indicating the theft of current. Through the breakage of wire 22 the contact between the springs 40 and 43 is broken. The shunt circuit in this arrangement is broken in spite of the contact 31 and the main current continues to flow just the same. As in the last described modification, the conducting powder, tube 21 and wire 22, can be so arranged as to vary the sensitiveness of the apparatus to prevent it being accidentally actuated.

Figs. 9 and 10 represent a second modification wherein the electro-dynamic effect of the shunt current it utilized as will be described. It consists of a vertical coil arranged upon a light tube of metal 45, the ends of the tube are fastened in the two central holes of two horizontal plates 46, 46, the latter of which are fastened against plate 18 of insulated material. This coil has two windings of the same direction around the tube 45; one long winding 58 is of thin insulated copper wire with an outer winding 48 of thin wire of high resistance, preferably made of German silver, and the second winding 49. The winding 48 has its ends fastened at the binding screws 17 with the screws 50, 50, while the winding 49 is connected with its ends to binding screws 51. In tube 45 are arranged two hollow soft iron cores 52, 53, the shorter one 52 is fastened to the plate 46 with tube 45; the other and longer core 53 is of such a length that a space of a few centimeters is left between its inner end and that of the other core and it moreover projects about 2 centimeters beyond the coil at its lower end. The core 53 is screwed upon the rod 11 in such a manner that a clearance 54 is left in which the spring 55 is arranged. The rod 11 is guided in tubing 45 by means of the iron cores 52 and 53, so that the core 53 can move to and from the core 52 for the distance of about 2 centimeters. At the upper end of rod 11, there is arranged upon a squared part, the insulating block 56 secured in position by means of a nut. Upon the block 56 are connected the flexible copper strips, 16 bent at their ends, and being in contact with the binding posts 17, 17, when the cores are in their lower position and out of contact when the cores are in their upper positions. $a$ and $d$ are the two current mains, $b$ and $c$ are the terminals of the inner circuit, and 57 is a double pole switch. The connections are as follows:—One binding post 17 is connected with $c$ which is one of the terminals of the lighting or power circuit. The other binding post 17 is connected with current main $d$. The contact 31 is inserted with the winding 49 in a shunt circuit, through 58 and 45 in connection with the main line. The apparatus works as follows:—When the consumption of electric energy is proceeding without a theft taking place, the copper strips 16 with their ends are in contact with binding posts 17, 17 the switch 57 being closed. The main current flows through wire $a$ into wire $b$ and from there to the lighting or power circuit, thence by $c$, it passes to the binding post 17, through copper strips 16 in the other binding post 17, and from there returns to the main $d$ or vice versa. When the switch is closed there are two circuits over the binding posts 17, 17 one of very great resistance over winding 58, 48, and one of small resistance, over the copper strips 16 to the effect that all the current passes through the copper strips 16 while the winding remains without current. If contact is established in the device 31 by the influence of an outside magnetic flux, the shunt circuit will be closed through wire 47, contact 31, binding post 51, winding 49, binding post 51, tubing 45, or vice versa. The wire of winding 49 is so dimensioned that the current in passing the winding will create a magnetic flux which will attract the core 53 and bring it in contact with core 52 thus breaking the main line circuit. A small part of the main line circuit still exists even while the switch is open viz., through the binding posts 17, 17 the winding always exciting a circuit. The winding is so arranged and dimensioned that the current flowing through the lighting or power circuit is reduced to about $\frac{2}{10}$ ampere, that is to say is practically suppressed in the circuit while the switch is open. If the magnetic flux is withdrawn from the meter, the contact 31 is again opened and the current in the winding 49 is again suppressed. There always remains the current in the windings 58—48 which keeps the two cores 52 and 53 in contact to simultaneously keep the copper strips 16 separated from the binding posts 17—17. In order to reëstablish the current, the switch 57 is opened which stops the current in the windings 58—48. The core 53 will then drop by gravity and the effect of the spring, the contact being again made between the binding posts 17, 17; if the switch 57 is now again closed the normal condition of the apparatus is resumed.

Having now particularly described the nature of my said invention and in what manner the same is to be performed, I declare that what I claim is:—

1. In a protective device of the class described for an electric meter the combination with two conductors, of two contacts normally out of engagement with each other, one of said contacts being connected to one of said conductors, and means responsive to a magnetic influence exerted upon the same in lateral direction for bringing one of said contacts into electrical connection with the other contact and closing a circuit for shunting thereby between said conductors.

2. In a protective device of the class described for an electric meter the combination with a switch, of two contacts normally out of engagement with each other, means for displacing said switch, and means responsive to a magnetic influence exerted upon the same in lateral direction for bringing one of said contacts into electrical connection with the other contact and for releasing thereby said switch displacing means.

3. In a protective device of the class described for an electric meter the combination with a conductor, of a switch in series with said conductor, means for normally holding said switch in circuit closing position, two contacts normally out of engagement with each other, each of said contacts being conductively connected with said conductor, means responsive to a magnetical influence exerted upon the same in lateral direction for bringing said contacts into electrical connection and releasing thereby said switch holding means.

4. In a protective device of the class described for an electric meter the combination, with a conductor in a main circuit, a switch in series with said conductor, two contacts normally out of engagement with each other said contacts being in a normally open shunt circuit to said main circuit, means for holding said switch in circuit closing position, means responsive to any magnetic influence exerted upon the same in lateral direction for bringing said contacts into electrical connection with each other and closing thereby said shunt circuit to release said switch holding means.

5. In a protecting device of the class described for an electric meter the combination a pair of terminals normally insulated from each other, a metallic member suspended from one of said terminals and adapted to make contact with the other terminal when under magnetic influence, in lateral direction, a conductor, a switch closing the circuit through said conductor, means for holding said switch in circuit closing position and means for releasing said switch when said terminals are conductively connected.

6. In a protecting device of the class described for an electric meter the combination with a conductor, a switch in said conductor, means for holding said switch in circuit closing position, said switch being of resilient material, two contacts normally out of engagement with each other, means responsive to magnetic influence exerted upon the same in lateral direction for bringing said contacts into electrical connection, and means in coaction with said contacts for opening said switch.

7. In a protection device of the class described for an electric meter the combination with a conductor, of a switch in said conductor, an element for holding said switch in circuit closing position, said element being releasable under the influence of heat and means for heating said element said last named means comprising a contact device in a circuit the contact device being responsive to any magnetic influence exerted upon the same in lateral direction.

In testimony whereof I have signed my name to this specification in the presence of two witnesses.

GIACOMO BERARDI.

Witnesses:
Pir Rinewun,
C A. Jerrari.